INVENTOR.
Dale Kleist
BY
ATTORNEYS

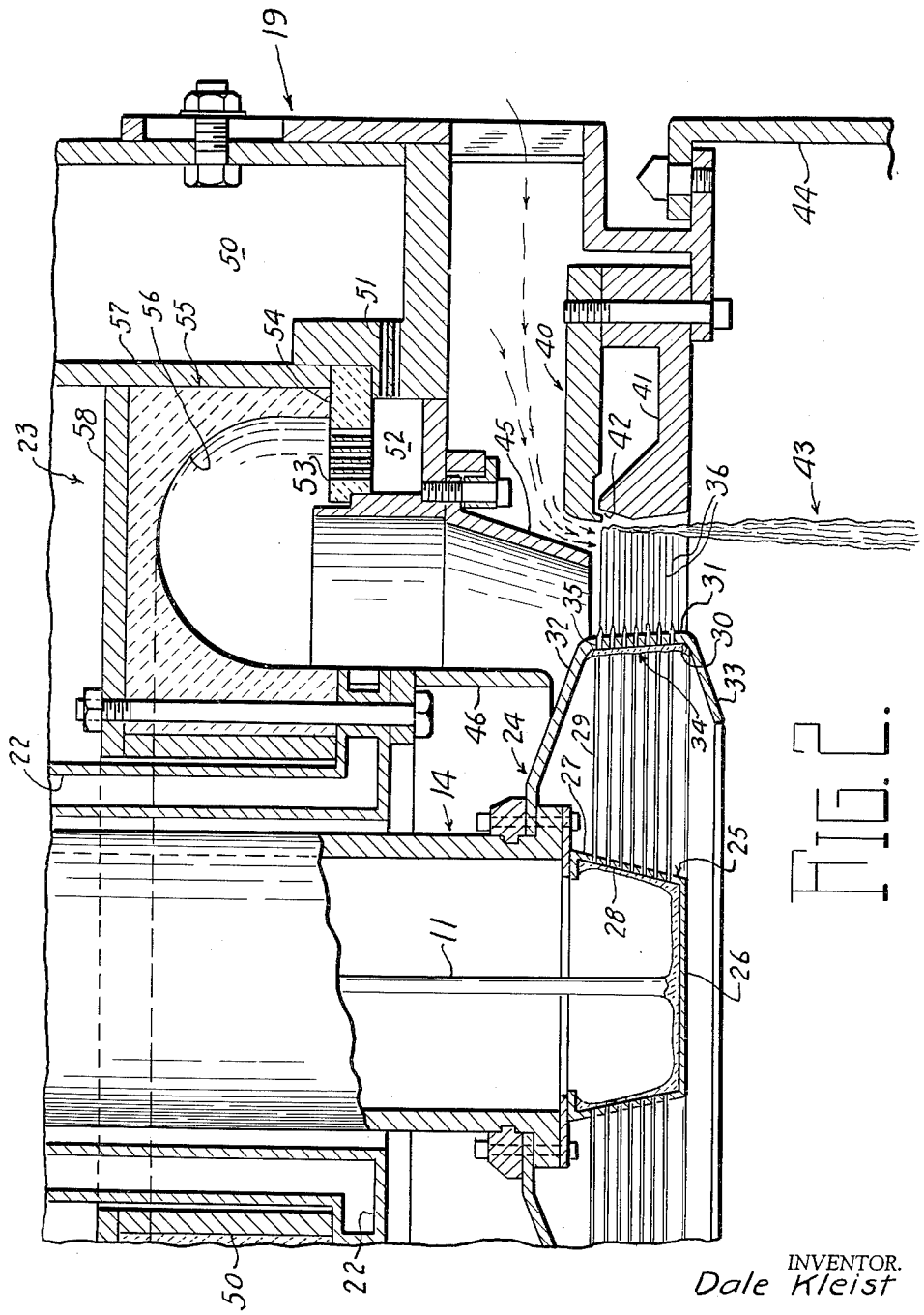

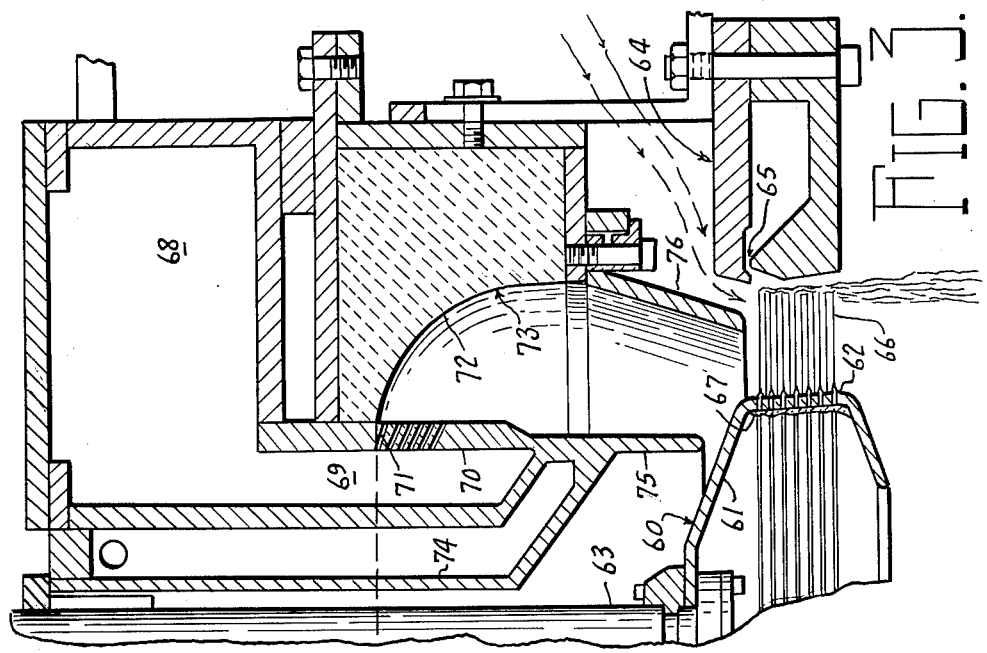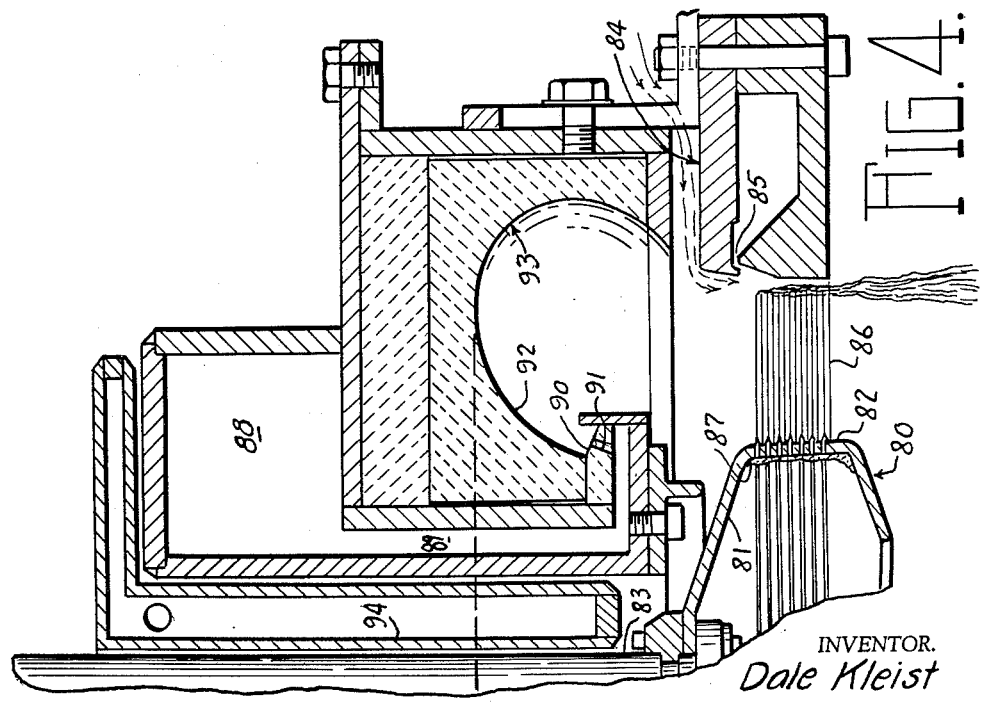

United States Patent Office 3,019,477
Patented Feb. 6, 1962

3,019,477
HIGH OUTPUT RADIANT HEATER FOR A GLASS FIBER FORMING APPARATUS
Dale Kleist, St. Louisville, Ohio, assignor to Owens-Corning Fiberglas Corporation, a corporation of Delaware
Filed Nov. 14, 1958, Ser. No. 773,988
7 Claims. (Cl. 18—2.5)

This invention relates to a high output radiant heater for a glass fiber forming apparatus, and more particularly to a radiant heater employed for the purpose of controlling the temperature of a centrifuge utilized for the purpose of projecting streams of glass into an annular blast of gaseous medium having sufficient kinetic energy to attenuate the streams into fine glass fibers.

This application is a continuation-in-part of my earlier application Serial No. 506,698, filed May 9, 1955, now abandoned, and is particularly directed to improved forms of the burner apparatus disclosed in the said earlier filed application as developed for use in connection with a commercial method and apparatus for centrifugally forming glass fibers.

The formation of fine glass fibers having commercially desirable physical properties, such as resiliency, length, pack parting strength, etc., by the process of centrifugally projecting streams of molten glass from a rotary centrifuge into a high speed attenuating blast of gaseous medium, such as steam, heated air, or products of combustion, involves the highly critical control of the temperature of the glass during its entire passage through the system.

The present invention is based upon the discovery that the rotary centrifuge by which the glass is divided into streams and projected into attenuating blast requires the most critical temperature control of any element of an apparatus for carrying out such a process. The centrifuge accumulates a substantial mass of molten glass as an annular body and applies to the annular body of glass sufficient centrifugal force to flow the glass outwardly through stream forming means at the periphery of the centrifuge and to project the streams of glass outwardly therefrom with sufficient force to penetrate into the high velocity portions of the annular attenuating blast so that the streams can be attenuated. It is also necessary that the glass shall be projected into the attenuating blast at a temperature suitable for attenuation.

The glass must be at a temperature above its liquidus temperature at least up to the time when it leaves the centrifuge in order to assure the continuous flow of an attenuable, elongated glass mass or stream from each of the centrifuge orifices. In order to achieve this control, the glass as originally fed into the centrifuge is at such a temperature level that the heat loss occurring during its passage through the centrifuge results in its being at the desired temperature when it issues from the centrifuge orifices. It has also been found that the glass should not be raised in temperature after it leaves the centrifuge in order to maintain dimensional stability and cohesiveness of each continuous, elongated glass mass or stream issuing from an orifice and from which a fiber is being attenuated.

Because the centrifuge must be mounted upon some rotating means such as a quill, and because the quill must be kept cool in order to prevent damage to its mounting and driving means and coolant must be circulated through protective jackets adjacent the quill and its bearings to prevent damaging them, large quantities of heat flow from the centrifuge and thus from the glass in the centrifuge, to the quill. Because of these heat losses and the limited contact of the glass with the centrifuge, the glass is unable to supply all of the heat lost and still remain in proper condition for attenuation into very fine, long fibers by the time it reaches the attenuating blast. Heat in sufficient quantity to balance the heat losses from the centrifuge must therefore be supplied to the centrifuge from some other source.

It has been suggested that heat be applied to the centrifuge for the purpose of furnishing the heat which flows from the centrifuge to the quill and the quill cooling means. Various forms of heaters have been suggested for this purpose.

In my earlier filed application referred to above, there is shown a radiant heater by means of which radiant heat is directed onto the peripheral portions of a metallic centrifuge used in such an apparatus and method for the formation of fine glass fibers. The present invention thus constitutes an improvement over the disclosure of my earlier filed application referred to above, and may be embodied in several forms of improved radiant heaters including a highly effective form by which large quantities of heat may be directed onto the critical portions of such a centrifuge.

It is, therefore, an object of this invention to provide an annular radiant heater designed to apply heat to a rotary centrifuge for the purpose of maintaining the glass carried by and projected from said centrifuge in condition for attenuation into very fine, long fibers.

It is another object of this invention to provide an annular radiant heater wherein the critical surfaces of the centrifuge are exposed to a wide expanse of ceramic surface which is heated by the combustion of fuel to a temperature level such that the centrifuge which is exposed to these surfaces and to the products of the combustion of the fuel, absorbs sufficient quantities of heat so that the glass is maintained in condition for attenuation into very fine long fibers.

It is yet another object of this invention to provide an annular heater wherein combustion of the heating gases is accomplished in a hot environment formed by high emissive substances so as to result in heat in the form of radiant heat as well as products of combustion being directed onto an area determined by the controlled configuration of the surface of the emissive material and the configuration of the burner outlet.

It is yet another object of this invention to provide an annular heater wherein the products of combustion of fuel burned therein may be applied to the critical areas of the centrifuge and to the zone surrounding the centrifuge for controlling the temperatures thereof but in which the products of combustion do not possess sufficient kinetic energy to appreciably deflect the projected streams from the planes of their issuance from the centrifuge.

Other and more important objects and advantages of the invention will be better understood from the specification which follows and from the drawings, in which—

FIG. 2 is a fragmentary view in vertical section and on an enlarged scale, showing the details of the apparatus illustrated in FIG. 1, and in particular showing a radiant heater embodying the invention;

FIG. 3 is a view similar to FIG. 2, but showing a modified form of heater embodying the invention;

FIG. 4 is a view similar to FIGS. 2 and 3, but showing yet another modification of the invention.

Figure 1:
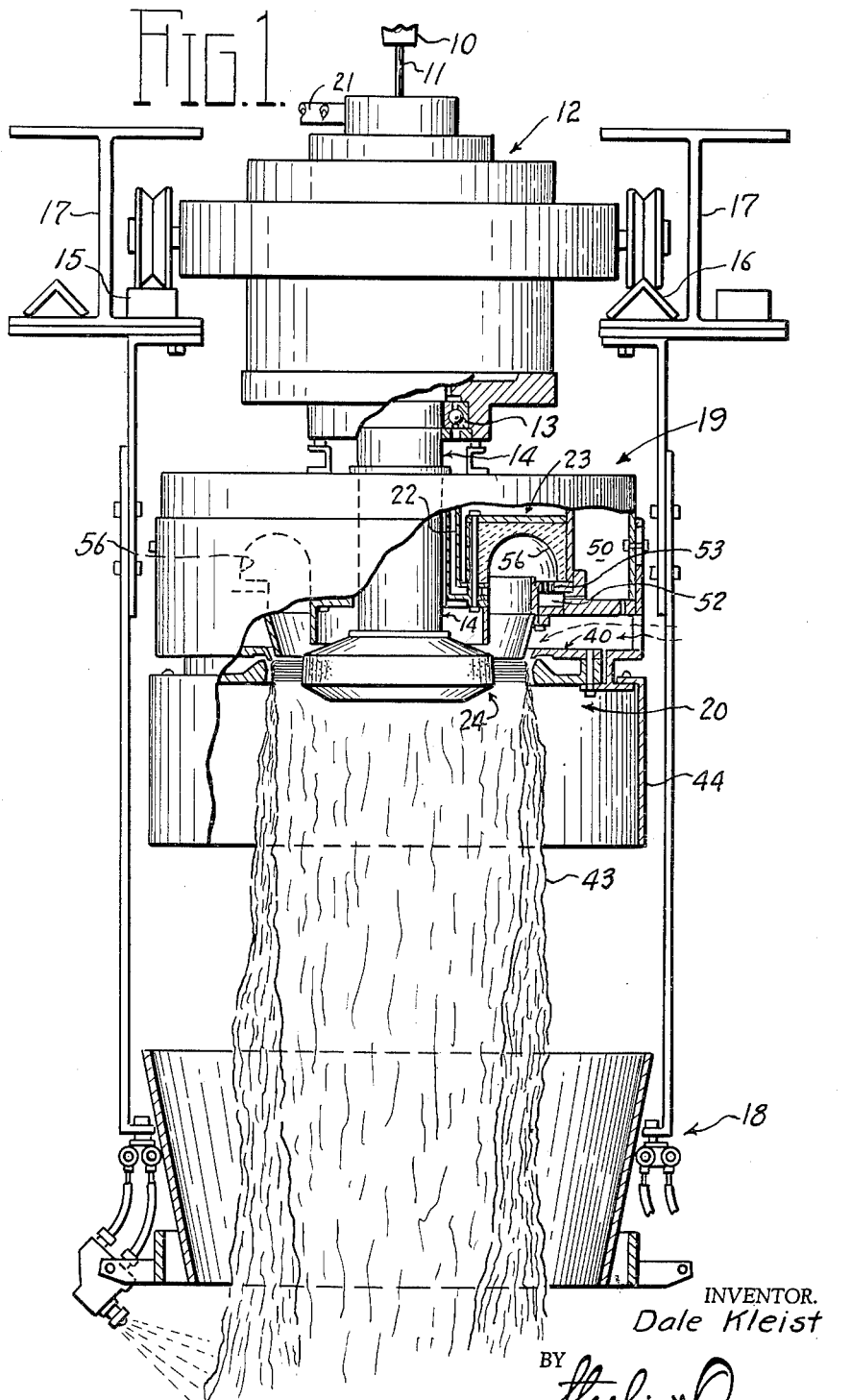
FIG. 1 is a fragmentary view, partly in elevation and partly in section, illustrating a commercial apparatus for forming fine glass fibers by the combination of centrifugal force and an attenuating blast.

In general, apparatus for carrying on a commercial rotary fiber forming process comprises the structure shown in FIGURE 1 of the drawings, and includes a glass stream former generally indicated at 10, which usually is located at the bottom of a forehearth of a glass melting tank wherein a large mass of glass is heated to a temperature above its liquidus temperature. For each of the fiber forming stations present in an industrial line, one of the stream formers 10 is provided for controlling and discharging a stream 11 of molten glass. Each station in such a line includes a drive unit 12 comprising an electric motor and suitable mounting means including a lower bearing 13 for a vertically extending hollow quill generally indicated at 14. The drive unit 12 is illustrated in FIGURE 1 as being mounted upon a pair of tracks 15 and 16 which are, in turn, supported by heavy, transversely extending beams 17, so that the unit can be moved into and out of operative position beneath the stream former 10 and above auxiliary mechanism such as a binder applying ring generally indicated at 18 in FIGURE 1 and a suitable fiber collecting conveyor (not shown).

The unit 12 serves as the structural support, not only of the contained motor and the rotary supported quill 14, but also for an annular heater housing 19 and an annular blower generally indicated at 20. The quill 14 (see also FIGURE 2) is cooled by suitable coolant admitted into the system through pipes 21 which are connected to a tubular cooling jacket 22, the jacket extending downwardly circumjacent the quill 14. The quill 14 and jacket 22 extend downwardly through the center of the heater housing 19 and an annular heater 23 located therein. At the lower end of the quill 14 there is removably mounted a centrifuge 24 and an internal glass distributor 25. The distributor 25 is supported from the bottom of the quill 14 and is illustrated in the drawings as being in the shape of an open-topped cup having an imperforate bottom 26 and an outwardly coned, perforated wall 27. The glass stream 11 flows downwardly into the distributor 25 which rotates with the quill 14 at high speed. Centrifugal force causes the glass from the stream 11 to flow outwardly along the bottom 26 of the distributor 25 and to climb up the wall 27 thereof, and to be projected outwardly therefrom through orifices 28 in the wall 27 as heavy distribution streams 29.

The streams impinge against the inner surface 30 of a generally cylindrical wall 31 of the centrifuge 24. The centrifuge 24 also comprises an upwardly extending return wall 32 by which it is supported at the bottom of the quill 14, and a lower, return lip 33 which is added to give the centrifuge 24 greater resistance distortion by centrifugal forces.

The streams of glass 29 thrown outwardly from the distributor are re-collected on the inner surface 30 of the centrifuge wall 31, forming thereon an annular body of glass generally indicated at 34 which rotates with the centrifuge. Centrifugal force acting on the glass in the body 34 flows it through stream forming orifices 35 which are drilled through the wall 31 of the centrifuge 24. In commercial production, there may be as many as 3000 to 4200, or more, of the orifices 35 drilled through the peripheral wall 31 of a centrifuge having a diameter of approximately 8" and a peripheral wall 31 of 1¼" vertical height. Such a centrifuge is rotated, for example, at a speed of about 3000 r.p.m. and the substantial centrifugal force thus created projects glass from the oriffices 35 in the form of glass streams 36.

The heater housing 19 also supports an annular blower generally indicated at 40 and which comprises a manifold 41 having a downwardly directed blast orifice 42. The gaseous medium discharged from the manifold 41 through the orifice 42, for example, steam under pressure, is directed downwardly in the form of an expanding blast and the streams 36 are projected by centrifugal force from the centrifuge 24 with sufficient impetus so that they penetrate the turbulent margin of the blast and enter its central high velocity portions where the streams 36 are attenuated into fine fibers, the fibers being directed downwardly in the form of a veil, generally indicated at 43.

A circular attenuation guard 44 is also supported by the heater housing 19, serving as a protective guard against the possibility of disintegration of the centrifuge 24 during operation.

In common with all expanding blasts of gaseous media, the blast emitted from the orifice 42 of the blower 40 has a substantial eductor effect. The eductor requirements of the blast must be at least partly satisfied or the blast will not apply effective attenuating force. Commercial apparatus with which a heater embodying the invention is designed to be employed, also comprises induced gas control means such as an outer air control ring 45 that is spaced inwardly from the upper inner corner of the blower 40 in order to direct induced gases downwardly adjacent the blast from the orifice 42, and an inner control ring 46 to limit the flow of induced gases downwardly in this part of the apparatus and to prevent substantial flow of heat upwardly past the centrifuge wall 32.

The heater 23 embodying the invention has an annular manifold 50 connected by passages 51 to a small inner chamber 52 from which lead a plurality of upwardly directed burner orifices 53, the orifices 53 being formed in an orifice plate 54. In the embodiment of the invention illustrated in FIGURE 2, the orifice plate 54 is at the outer margin of an upwardly domed, refractory, radiating element generally indicated at 55. The radiating element 55 has a contoured inner surface 56 and is supported in position by suitable mounting plates 57, 58, etc.

A combustible mixture of gases is fed to the manifold 50 and to the chamber 52 and emitted from the orifices 53. Flame from these burning gases is directed by the orifices 53 upwardly along the surface of the refractory element 55, sweeping over and inwardly along the inner surface 56 thereof and heating the refractory 55 to a very high temperature, say, in the order of 2400° F., or higher. Because of the emissivity of the element 55, a percentage of this heat is emitted therefrom in the form of radiant heat energy. As will be observed in FIGURE 2, and according to the teachings of this invention, a large surface of the radiating element 55 is exposed to the outer surface of the centrifuge wall 31 and the outer shoulder of the coned return wall 32. Radiant heat energy thus flows from the highly heated refractory element 55 directly onto these critical portions of the centrifuge 24 and supplies heat to the centrifuge 24 so that the centrifuge 24 does not absorb heat in significant quantity from the body of glass 34 or the glass in the stream forming orifices 35. Combustion of the mixture of gas in the environment formed by the refractory element 55 results in a higher combustion temperature than would result if the gases were burned in a cold environment.

The embodiment of the invention fragmentarily illustrated in FIGURE 3 comprises parts substantially identical with those discussed with respect to FIGURE 2 but includes a modified form of heater embodying the invention. In FIGURE 3, a centrifuge generally indicated at 60, and including a concial return wall 61 and a generally cylindrical perforated wall 62, is shown as being mounted for rotation at the bottom of the tubular quill 63. An annular gaseous blower 64 having a blast orifice 65 surrounds the centrifuge 60 and applies an attenuating blast to streams 66 of glass which are projected outwardly through stream forming orifices 67 in the wall 62 of the centrifuge 60.

The embodiment of the instant invention disclosed in FIGURE 3 comprises a combustible mixture manifold 68 located above a passageway 69 for the gases which leads to an orifice plate 70 in which there are formed a plurality of gas orifices 71. The orifices 71 are directed toward the inner upper side of a contoured surface 72 of a refractory element 73. In this embodiment of the invention, the orifices 71 are at the inner side of the refractory element 73 and are directed downwardly since the contoured surface 72 of the element 73 has an arcuate extent of only about 90° rather than about 180°, as in the case of the embodiment of the invention illustrated in FIGURE 2. In common with the embodiment of the invention illustrated in FIGURE 2, the quill 63 is protected by a coolant jacket 74 and induced gases are directed and controlled by gas control rings 75 and 76.

As in the embodiment of FIGURE 2, the refractory element 73 is fabricated from a material of high emissivity and a large expanse of its contoured surface 72 is exposed to the perforated peripheral face 62 of the centrifuge 60 and the shoulder of the upper return wall 61 of the centrifuge 60. Again, combustion of the gases in the environment of the hot ceramic element 73 produce a high temperature which heats the ceramic element 73 and by reason of its emissivity directs quantities of radiant heat energy onto the peripheral portions of the centrifuge 60.

In the embodiment of the invention illustrated in FIGURE 4, elements of apparatus are shown which are substantially identical with those illustrated in FIGURES 2 and 3 and which include a centrifuge generally indicated at 80 having a return wall 81 and a perforated peripheral wall 82, the centrifuge 80 being supported on the bottom of a hollow rotary quill 83. An annular blower 84 has a blast orifice 85 to discharge an attenuating blast of gaseous medium for the purpose of attenuating fibers from streams 86 projeceted outwardly into the attenuating blast by stream forming orifices 87 in the wall 82 of the centrifuge 80.

A radiant heater embodying the invention, in this modification, has an upper annular combustion mixture manifold 88 leading to an annular gas chamber 89 and to an orifice plate 90 through which there are formed a number of gas orifices 91. In this embodiment of the invention, the orifices 91 are directed upwardly along the inner side of a contoured surface 92 of a refractory element 93. In this embodiment of the invention, the contoured surface 92 is so shaped as to expose an even larger area of the surface 72 to the critical portions of the centrifuge 80, i.e., its peripheral wall 82 and the lower shoulder of its return wall 81.

The embodiment of the invention illustrated in FIGURE 4 and the particular contour of the surface 92, as contrasted with the surfaces 56 of FIGURE 2 and 72 of FIGURE 3, demonstrates how refractory elements of radiant heaters embodying the invention may be contoured in order to achieve advantageous exposures of radiating surfaces to the surfaces of the centrifuges 24, 60 or 80, respectively, in order to apply radiant heat energy thereto. The three shapes illustrated in FIGURES 2, 3 and 4 are merely illustrative of the shapes which may be employed for achieving this result, and these particular shapes are not intended to be limiting upon the invention nor to constitute, per se, critical shapes, except as modifications of the invention.

As in the case of the embodiments of FIGURES 2 and 3, the embodiment of the invention illustrated in FIGURE 4 is employed with structures designed to attenuate fine fibers and which include, as well, a suitable cooling jacket 94 for protecting the quill 83 and other parts of the apparatus. As explained above, the high emissivity of the refractory element 93 directs large quantities of radiant heat energy onto the important surfaces of the centrifuge 80 for the purpose of preventing the loss of heat from the glass handled thereby to the quill 83 and to the cooling jacket 94 positioned circumjacent thereto for protecting the quill 83 and its mounting means.

Figure 5:
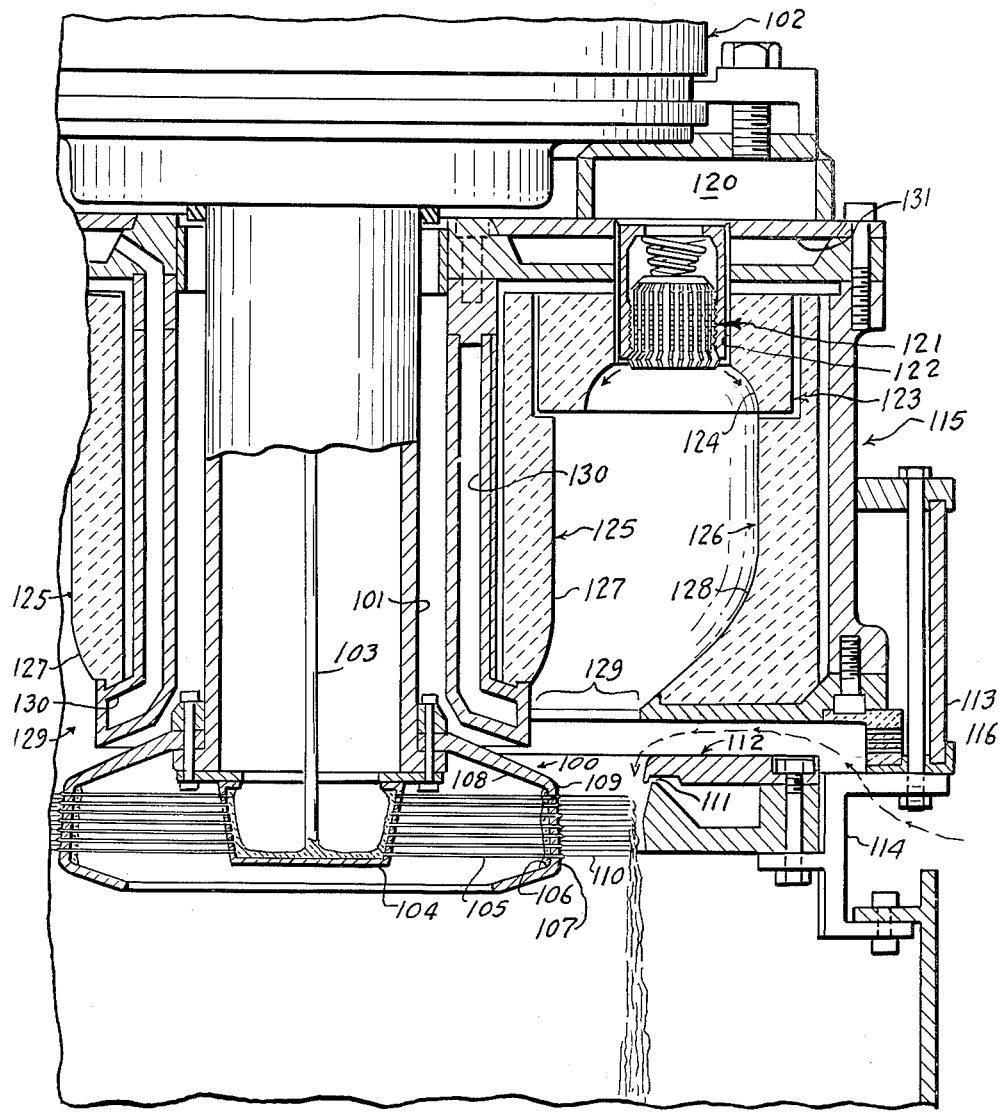
FIG. 5 is a view similar to FIGS. 2, 3 and 4 and illustrating a further improved modification of the invention.

In FIGURE 5 of the drawings, there is shown a more complete apparatus including refinements in auxiliary apparatus and an improved modification of radiant heater embodying the invention. As in the case of the embodiments of FIGURES 1, 2, 3 and 4, a rotary centrifuge 100 is supported at the bottom of a hollow quill 101 which is mounted and driven by a drive mechanism generally indicated at 102. A glass stream 103 is flowed from a suitable molten glass source downwardly from the interior of the quill 101 and into a cup-shaped glass distributor 104 mounted on the bottom of the quill 101. Glass flowing into the distributor 104 is thrown outwardly in the form of heavy distribution streams 105 which are re-collected in an annular body 106 on the inner surface of a perforated peripheral wall 107 of the centrifuge 100. The centrifuge 100 is mounted on the bottom of the quill 101 by a conical return wall 108. Glass in the body 106 is flowed by centrifugal force through orifices 109 in the peripheral wall 107 and projected outwardly in the form of streams 110 into an annular attenuating blast emitted from a blast orifice 111 of a blower 112. The blower 112 is supported by brackets 113 and 114 from an annular heater unit 115 which depends, in turn, from the drive unit 102. Induced gases flow into the system over the top of the blower 112, and an ambient gas control heater generally indicated at 116 is positioned to play a flame across the path of the induced gases to increase their temperature to about that of the temperature of the attenuating blast fed from the blower 112. The induced gas control just discussed does not constitute a part of the instant invention, per se, and is more fully disclosed and claimed in earlier filed Kleist and Snow application Serial No. 594,803, filed June 29, 1956, and in continuing applications thereof Serial No. 769,820, filed October 27, 1958 and Serial No. 769,870, filed October 27, 1958.

The heater 115 embodying the instant invention in the improved modification illustrated in FIGURE 5, comprises an annular combustible mixture manifold 120 having a fluted orifice former 121. The orifice former 121 extends downwardly through suitable openings 122 in a top block 123 of the heater 115. The top block 123 is fabricated from a refractory material having a high emissivity and has a domed surface 124 shaped to direct flames from the burning of the combustible mixture downwardly and outwardly. The top block 123 is positioned at the upper sides of an inner refractory wall 125 and an outer, spaced, refractory wall 126. The inner wall 125 is cut back and the outer wall 126 curved inwardly to increase the extent of their respective contoured surfaces 127 and 128 so as to provide larger areas over which the combustible mixture burns, so that the temperature of the ceramic elements 124, 125 and 126 will reach a high level. The high temperature of these ceramic elements results in a higher temperature of combustion and, because of their high emissivity results in the direction of radiant heat energy downwardly through an annular open throat 129 which is above and directed at the important surfaces of the centrifuge 100, i.e., the peripheral surface 107 and the lower shoulder of the return wall 108.

As in the case of the earlier described embodiments of the invention, the apparatus is protected by suitable cooling jackets including a quill jacket 130 and a burner top jacket 131.

The modification of the invention illustrated in FIGURE 5 embodies a further improvement over the embodiments of FIGS. 1–4 in the control and utilization of the combustion products gases. In the embodiment of FIG. 5 the contoured walls 127 and 128 are shaped to direct the gases through the throat 129 onto the critical peripheral areas of the centrifuge 100 in addition to the radiant energy discussed above. Although combustion takes place within the chamber defined by the ceramic elements 124, 125 and 126, the throat 129 is wide enough open so that it does not function as a restricted orifice nor impart velocity or kinetic energy to the gases sufficient to appreciably deflect the projected streams of glass 110 from their planes of issuance from the centrifuge 100.

What I claim is:

1. In a rotary fiber forming apparatus which comprises a generally cylindrical centrifuge having a plurality of vertically spaced, circumferential rows of stream forming orifices in its periphery the combination with said centrifuge of a high output, heater comprising an annular refractory element extending circumferentially around said centrifuge at a level above the uppermost one of said rows of stream forming orifices of the centrifuge, said refractory element having a generally arcuate cross section with its concave surface directed toward and at least partially exposed in line of sight to the peripheral area of the centrifuge, a combustible gas supply manifold and means for feeding said gases for combustion along the concave surface of said refractory element.

2. In an apparatus according to claim 1 a heater in which the means for feeding the combustible gases are located along one margin of the refractory element.

3. In a rotary fiber forming system employing a centrifuge which has an annular peripheral area having a plurality of circumferentially extending rows of stream forming orifices therein and in which molten glass at a temperature above its liquidus is flowed into the interior of the centrifuge, is distributed over the interior of the periphery thereof, and is projected outwardly as streams issuing from the stream forming means by centrifugal force in planes normal to the axis of the centrifuge and into an annular, downwardly moving, attenuating blast the combination therewith of a high output, heater comprising an annular combustible gas supply manifold supported co-axially with said centrifuge, an annular heater housing co-axial with said centrifuge and positioned at a level above the level of the uppermost one of said rows of orifices in the peripheral area of said centrifuge, an annular refractory element having a dome shaped downwardly open profile, a plurality of gas feeding means leading from said manifold to the interior of the dome of said refractory element for feeding combustible gases along the surfaces thereof, a pair of annular, radially spaced, downwardly extending, refractory burner walls having contoured surfaces blending into the contour of said refractory element at their upper ends and forming an open throat therebetween at their lower ends, the level of said throat being above the level of the uppermost one of said rows of orifices in the peripheral area of said centrifuge and exposing therethrough a large expanse of said refractories to the peripheral area of said centrifuge, the lower portions of said walls being shaped for directing escaping combustion products toward the peripheral area of said centrifuge and said throat being substantially free of restrictive effect on the combustion products whereby the combustion products have no appreciable kinetic energy and do not deflect the centrifugally projected streams issuing from the centrifuge.

4. In an apparatus according to claim 2, a heater in which the means for feeding the combustible gases extend along the outer margin of the refractory element.

5. In an apparatus according to claim 1, a heater in which the refractory element has a cross section having an arcuate surface forming an upper, outer quadrant of the surface of a torus circumjacent the centrifuge.

6. In an apparatus according to claim 1, a heater in which the surface of the refractory element forms an upwardly arching dome having horizontally spaced, contoured side walls, forming a downwardly opening throat for the escape of combustion products, the throat being substantially free of restrictive effect whereby the combustion products have no appreciable kinetic energy.

7. In an apparatus according to claim 6, a heater in which the upper center of the dome is substantially semicircular and the side walls extend downwardly a distance substantially greater than the lateral distance between such walls, and are contoured for directing escaping combustion products toward the peripheral areas of the centrifuge.

References Cited in the file of this patent
UNITED STATES PATENTS

| | | |
|---|---|---|
| 2,215,079 | Hess | Sept. 17, 1940 |
| 2,422,481 | Grantham | June 17, 1947 |
| 2,464,333 | McGlaughlin | Mar. 15, 1949 |
| 2,497,369 | Peyches | Feb. 14, 1950 |
| 2,525,970 | Spier et al. | Oct. 17, 1950 |
| 2,542,750 | Butz | Feb. 20, 1951 |
| 2,575,291 | Owen | Nov. 13, 1951 |
| 2,587,710 | Downey | Mar. 4, 1952 |
| 2,609,566 | Slayter et al. | Sept. 9, 1952 |
| 2,671,507 | Morck | Mar. 9, 1954 |
| 2,707,847 | Anliker | May 10, 1955 |
| 2,832,580 | Hess | Apr. 29, 1958 |